US008024724B2

(12) United States Patent
Garrison Stuber et al.

(10) Patent No.: US 8,024,724 B2
(45) Date of Patent: Sep. 20, 2011

(54) FIRMWARE DOWNLOAD

(75) Inventors: Michael T. Garrison Stuber, Newman Lake, WA (US); Brett D. McDonald, Seneca, SC (US); Kevin D. Guthrie, Seneca, SC (US); Eugene L. Falendysz, Jr., Seneca, SC (US)

(73) Assignee: Itron, Inc., Liberty Lake, WA (US)

( * ) Notice: Subject to any disclaimer, the term of this patent is extended or adjusted under 35 U.S.C. 154(b) by 1056 days.

(21) Appl. No.: 11/897,232

(22) Filed: Aug. 29, 2007

(65) Prior Publication Data
US 2008/0092132 A1    Apr. 17, 2008

Related U.S. Application Data

(60) Provisional application No. 60/841,633, filed on Aug. 31, 2006.

(51) Int. Cl.
*G06F 9/44* (2006.01)
*G06F 9/445* (2006.01)
*G06F 15/16* (2006.01)
*H04L 9/32* (2006.01)

(52) U.S. Cl. ........ 717/172; 717/176; 709/249; 709/252; 713/176

(58) Field of Classification Search .................. 717/168, 717/172, 178; 713/176; 709/249, 252
See application file for complete search history.

(56) References Cited

U.S. PATENT DOCUMENTS

| | | |
|---|---|---|
| 4,799,062 A | 1/1989 | Sanderford, Jr. et al. |
| 4,977,577 A | 12/1990 | Arthur et al. |
| 4,998,102 A | 3/1991 | Wyler et al. |
| 5,067,136 A | 11/1991 | Arthur et al. |
| 5,095,493 A | 3/1992 | Arthur et al. |
| 5,119,396 A | 6/1992 | Snderford, Jr. |
| 5,198,796 A | 3/1993 | Hessling, Jr. |
| 5,265,120 A | 11/1993 | Sanderford, Jr. |
| 5,310,075 A | 5/1994 | Wyler |
| 5,311,541 A | 5/1994 | Sanderford, Jr. |
| 5,377,222 A | 12/1994 | Sanderford, Jr. |
| 5,377,232 A | 12/1994 | Davidov et al. |
| 5,438,329 A | 8/1995 | Gastouniotis et al. |
| 5,457,713 A | 10/1995 | Sanderford, Jr. et al. |
| 5,486,805 A | 1/1996 | Mak |
| 5,598,427 A | 1/1997 | Arthur et al. |
| 5,604,768 A | 2/1997 | Fulton |
| 5,626,755 A | 5/1997 | Keyser et al. |

(Continued)

OTHER PUBLICATIONS

Albretsen, Aleksander, "Investigate M2M-related communication standards that exist on the global market today," Agder University College, Jun. 2006, 40pg.*

(Continued)

*Primary Examiner* — Li Zhen
*Assistant Examiner* — Ryan Coyer
(74) *Attorney, Agent, or Firm* — Dority & Manning, P.A.

(57) ABSTRACT

Disclosed are apparatus and methodology subject matters for upgrading firmware associated with one or more metrology devices and adjunct devices. Methods are disclosed for broadcast transmission of portions of a firmware image file from an originating device over a network connecting multiple devices to be upgraded. The entire image file may be transmitted as segments to be assembled by the end devices. Broadcast segments not properly received from the originating device may be retried directly from the originating device or from neighbors correctly receiving the segment. A viral propagation methodology is disclosed as an alternative to portions of the broadcast methodology.

17 Claims, 3 Drawing Sheets

U.S. PATENT DOCUMENTS

| | | | |
|---|---|---|---|
| 5,661,750 A | 8/1997 | Fulton | |
| 5,668,828 A | 9/1997 | Sanderford, Jr. et al. | |
| 5,696,441 A | 12/1997 | Mak et al. | |
| RE35,829 E | 6/1998 | Sanderford, Jr. | |
| 5,867,714 A | 2/1999 | Todd et al. | |
| 5,920,589 A | 7/1999 | Rouquette et al. | |
| 5,926,531 A | 7/1999 | Petite | |
| 5,933,072 A | 8/1999 | Kelley | |
| 5,953,368 A | 9/1999 | Sanderford et al. | |
| 5,963,650 A * | 10/1999 | Simionescu et al. | 705/63 |
| 5,987,058 A | 11/1999 | Sanderford et al. | |
| 6,028,522 A | 2/2000 | Petite | |
| 6,031,883 A | 2/2000 | Sanderford, Jr. et al. | |
| 6,044,062 A | 3/2000 | Brownrigg et al. | |
| 6,047,016 A | 4/2000 | Ramberg et al. | |
| 6,100,816 A | 8/2000 | Moore | |
| 6,163,276 A | 12/2000 | Irving et al. | |
| 6,178,197 B1 | 1/2001 | Froelich et al. | |
| 6,181,258 B1 | 1/2001 | Summers et al. | |
| 6,195,018 B1 | 2/2001 | Ragle et al. | |
| 6,208,266 B1 | 3/2001 | Lyons et al. | |
| 6,218,953 B1 | 4/2001 | Petite | |
| 6,232,885 B1 | 5/2001 | Ridenour et al. | |
| 6,233,327 B1 | 5/2001 | Petite | |
| 6,246,677 B1 | 6/2001 | Nap et al. | |
| 6,249,516 B1 | 6/2001 | Brownrigg et al. | |
| 6,263,009 B1 | 7/2001 | Ramberg et al. | |
| 6,335,953 B1 | 1/2002 | Sanderford, Jr. et al. | |
| 6,363,057 B1 | 3/2002 | Ardalan et al. | |
| 6,369,769 B1 | 4/2002 | Nap et al. | |
| 6,377,609 B1 | 4/2002 | Brennan, Jr. | |
| 6,396,839 B1 | 5/2002 | Ardalan et al. | |
| 6,424,270 B1 | 7/2002 | Ali | |
| 6,426,027 B1 | 7/2002 | Scarborough, III et al. | |
| 6,430,268 B1 | 8/2002 | Petite | |
| 6,437,692 B1 | 8/2002 | Petite et al. | |
| 6,452,986 B1 | 9/2002 | Luxford et al. | |
| 6,456,644 B1 | 9/2002 | Ramberg et al. | |
| 6,496,575 B1 | 12/2002 | Vassell et al. | |
| 6,538,577 B1 | 3/2003 | Ehrke et al. | |
| 6,604,434 B1 | 8/2003 | Hamilton et al. | |
| 6,612,188 B2 | 9/2003 | Hamilton | |
| 6,614,804 B1 | 9/2003 | McFadden et al. | |
| 6,617,879 B1 | 9/2003 | Chung | |
| 6,617,976 B2 | 9/2003 | Walden et al. | |
| 6,617,978 B2 | 9/2003 | Ridenour et al. | |
| 6,618,578 B1 | 9/2003 | Petite | |
| 6,626,048 B1 | 9/2003 | Dam Es et al. | |
| 6,628,764 B1 | 9/2003 | Petite | |
| 6,639,939 B1 | 10/2003 | Naden et al. | |
| 6,640,334 B1 | 10/2003 | Rasmussen | |
| 6,650,249 B2 | 11/2003 | Meyer et al. | |
| 6,657,552 B2 | 12/2003 | Belski et al. | |
| 6,671,586 B2 | 12/2003 | Davis et al. | |
| 6,697,365 B1 * | 2/2004 | Messenger | 709/252 |
| 6,700,902 B1 | 3/2004 | Meyer | |
| 6,704,301 B2 | 3/2004 | Chari et al. | |
| 6,734,663 B2 | 5/2004 | Fye et al. | |
| 6,747,557 B1 | 6/2004 | Petite et al. | |
| 6,747,981 B2 | 6/2004 | Ardalan et al. | |
| 6,778,099 B1 | 8/2004 | Meyer et al. | |
| 6,784,807 B2 | 8/2004 | Petite et al. | |
| 6,798,190 B2 | 9/2004 | Harding et al. | |
| 6,813,571 B2 | 11/2004 | Lightbody et al. | |
| 6,816,538 B2 | 11/2004 | Shuey et al. | |
| 6,836,108 B1 | 12/2004 | Balko et al. | |
| 6,836,737 B2 | 12/2004 | Petite et al. | |
| 6,850,197 B2 | 2/2005 | Paun | |
| 6,859,186 B2 | 2/2005 | Lizalek et al. | |
| 6,862,498 B2 | 3/2005 | David et al. | |
| 6,867,707 B1 | 3/2005 | Kelley et al. | |
| 6,871,150 B2 | 3/2005 | Huber et al. | |
| 6,885,309 B1 | 4/2005 | Van Heteren | |
| 6,891,838 B1 | 5/2005 | Petite et al. | |
| 6,900,737 B1 | 5/2005 | Ardalan et al. | |
| 6,914,533 B2 | 7/2005 | Petite | |
| 6,914,893 B2 | 7/2005 | Petite | |
| 6,918,311 B2 | 7/2005 | Nathan | |
| 6,930,785 B1 | 8/2005 | Weyand et al. | |
| 6,931,445 B2 | 8/2005 | Davis | |
| 6,940,396 B2 | 9/2005 | Hammond et al. | |
| 6,944,555 B2 | 9/2005 | Blackett et al. | |
| 6,965,575 B2 | 11/2005 | Srikrishna et al. | |
| 6,972,555 B2 | 12/2005 | Balko et al. | |
| 6,982,651 B2 | 1/2006 | Fischer | |
| 6,988,182 B2 | 1/2006 | Teachman et al. | |
| 7,035,906 B1 | 4/2006 | Ellis, III | |
| 7,046,682 B2 | 5/2006 | Carpenter et al. | |
| 7,047,287 B2 * | 5/2006 | Sim et al. | 709/252 |
| 7,053,770 B2 | 5/2006 | Ratiu et al. | |
| 7,054,271 B2 | 5/2006 | Brownrigg et al. | |
| 7,054,313 B1 | 5/2006 | Gerszberg et al. | |
| 7,065,457 B1 | 6/2006 | Germer et al. | |
| 7,075,414 B2 | 7/2006 | Giannini et al. | |
| 7,082,549 B2 | 7/2006 | Rao et al. | |
| 7,085,824 B2 | 8/2006 | Forth et al. | |
| 7,093,244 B2 | 8/2006 | Lajoie et al. | |
| 7,103,511 B2 | 9/2006 | Petite | |
| 7,126,494 B2 | 10/2006 | Ardalan et al. | |
| 7,209,466 B2 * | 4/2007 | Cabana | 370/338 |
| 7,542,759 B2 * | 6/2009 | Edwards et al. | 717/178 |
| 7,543,074 B2 * | 6/2009 | O'Neal et al. | 709/252 |
| 7,564,786 B2 * | 7/2009 | Lim et al. | 709/252 |
| 2002/0019725 A1 | 2/2002 | Petite | |
| 2002/0146985 A1 | 10/2002 | Naden | |
| 2002/0169643 A1 | 11/2002 | Petite et al. | |
| 2003/0048199 A1 | 3/2003 | Zigdon et al. | |
| 2003/0063723 A1 | 4/2003 | Booth et al. | |
| 2003/0078029 A1 | 4/2003 | Petite | |
| 2003/0093484 A1 | 5/2003 | Petite | |
| 2003/0103486 A1 | 6/2003 | Salt et al. | |
| 2003/0179149 A1 | 9/2003 | Savage et al. | |
| 2004/0004555 A1 | 1/2004 | Martin | |
| 2004/0008663 A1 | 1/2004 | Srikrishna et al. | |
| 2004/0040368 A1 | 3/2004 | Guckenberger et al. | |
| 2004/0053639 A1 | 3/2004 | Petite et al. | |
| 2004/0061623 A1 | 4/2004 | Tootoonian Mashhad et al. | |
| 2004/0062224 A1 | 4/2004 | Brownrigg et al. | |
| 2004/0085928 A1 | 5/2004 | Chari et al. | |
| 2004/0088083 A1 | 5/2004 | Davis et al. | |
| 2004/0131125 A1 | 7/2004 | Sanderford, Jr. et al. | |
| 2004/0183687 A1 | 9/2004 | Petite et al. | |
| 2004/0192415 A1 | 9/2004 | Luglio et al. | |
| 2004/0203336 A1 * | 10/2004 | Sinnarajah et al. | 455/3.01 |
| 2004/0205779 A1 | 10/2004 | Almeida et al. | |
| 2004/0215744 A1 | 10/2004 | Motoyama et al. | |
| 2004/0218616 A1 | 11/2004 | Ardalan et al. | |
| 2004/0230963 A1 | 11/2004 | Rothman et al. | |
| 2004/0264379 A1 | 12/2004 | Srikrishna et al. | |
| 2004/0264435 A1 | 12/2004 | Chari et al. | |
| 2005/0024235 A1 | 2/2005 | Shuey et al. | |
| 2005/0030199 A1 | 2/2005 | Petite et al. | |
| 2005/0036487 A1 | 2/2005 | Srikrishna | |
| 2005/0043059 A1 | 2/2005 | Petite et al. | |
| 2005/0043860 A1 | 2/2005 | Petite | |
| 2005/0052290 A1 | 3/2005 | Naden et al. | |
| 2005/0052328 A1 | 3/2005 | De Angelis | |
| 2005/0065743 A1 | 3/2005 | Cumming et al. | |
| 2005/0068970 A1 | 3/2005 | Srikrishna et al. | |
| 2005/0074015 A1 | 4/2005 | Chari et al. | |
| 2005/0129005 A1 | 6/2005 | Srikrishna et al. | |
| 2005/0147097 A1 | 7/2005 | Chari et al. | |
| 2005/0163144 A1 | 7/2005 | Srikrishna et al. | |
| 2005/0169020 A1 | 8/2005 | Knill | |
| 2005/0171696 A1 | 8/2005 | Naden et al. | |
| 2005/0172024 A1 | 8/2005 | Cheifot et al. | |
| 2005/0190055 A1 | 9/2005 | Petite | |
| 2005/0195768 A1 | 9/2005 | Petite et al. | |
| 2005/0195775 A1 | 9/2005 | Petite et al. | |
| 2005/0201397 A1 | 9/2005 | Petite | |
| 2005/0218873 A1 | 10/2005 | Shuey et al. | |
| 2005/0226179 A1 | 10/2005 | Behroozi | |
| 2005/0243867 A1 | 11/2005 | Petite | |
| 2005/0251401 A1 | 11/2005 | Shuey | |
| 2005/0251403 A1 | 11/2005 | Shuey | |
| 2005/0271006 A1 | 12/2005 | Chari et al. | |
| 2005/0278440 A1 | 12/2005 | Scoggins | |

| | | |
|---|---|---|
| 2006/0002350 A1 | 1/2006 | Behroozi |
| 2006/0012935 A1 | 1/2006 | Murphy |
| 2006/0018303 A1 | 1/2006 | Sugiarto et al. |
| 2006/0023853 A1 | 2/2006 | Shelley et al. |
| 2006/0031180 A1 | 2/2006 | Tamarkin et al. |
| 2006/0038548 A1 | 2/2006 | Shuey |
| 2006/0043961 A1 | 3/2006 | Loy |
| 2006/0056331 A1 | 3/2006 | Ratiu et al. |
| 2006/0056370 A1 | 3/2006 | Hancock et al. |
| 2006/0056423 A1 | 3/2006 | Ratiu et al. |
| 2006/0066455 A1 | 3/2006 | Hancock et al. |
| 2006/0071810 A1 | 4/2006 | Scoggins et al. |
| 2006/0071812 A1 | 4/2006 | Mason, Jr. et al. |
| 2006/0079254 A1 | 4/2006 | Hogan |
| 2006/0089914 A1 | 4/2006 | Shiel et al. |
| 2006/0130046 A1* | 6/2006 | O'Neill ............ 717/168 |
| 2007/0283001 A1* | 12/2007 | Spiess et al. ............ 709/224 |

OTHER PUBLICATIONS

Han et al., "Sensor network software update management: a survey," John Wiley & Sons, 2005, 12pg.*

OEB Metering WG, Metering Working Group, "Smart Meter initiative", Meeting Notes, Sep. 16, 2004.

"Metering Capability Framework", Southern California Edison Advanced Metering Infrastructure (AMI) Program, 2006.

International Search Report for PCT International Application No. PCT/US 07/19086; search completed Jan. 1, 2008.

* cited by examiner

US 8,024,724 B2

FIRMWARE DOWNLOAD

PRIORITY CLAIM

This application claims the benefit of previously filed U.S. Provisional Patent Application entitled "FIRMWARE DOWNLOAD," assigned U.S. Ser. No. 60/841,633, filed Aug. 31, 2006, and which is hereby incorporated herein by reference in its entirety for all purposes.

FIELD OF THE INVENTION

The present technology relates to utility meters. More particularly, the present technology relates to apparatus and methodologies for downloading firmware through a network to end devices including utility meters and relays.

BACKGROUND OF THE INVENTION

The general object of metrology is to monitor one or more selected physical phenomena to permit a record of monitored events. Such basic purpose of metrology can be applied to a variety of metering devices used in a number of contexts. One broad area of measurement relates, for example, to utility meters. Such role may also specifically include, in such context, the monitoring of the consumption or production of a variety of forms of energy or other commodities, for example, including but not limited to, electricity, water, gas, or oil.

More particularly concerning electricity meters, mechanical forms of registers have been historically used for outputting accumulated electricity consumption data. Such an approach provided a relatively dependable field device, especially for the basic or relatively lower level task of simply monitoring accumulated kilowatt-hour consumption.

The foregoing basic mechanical form of register was typically limited in its mode of output, so that only a very basic or lower level metrology function was achieved. Subsequently, electronic forms of metrology devices began to be introduced, to permit relatively higher levels of monitoring, involving different forms and modes of data.

In the context of electricity meters specifically, for a variety of management and billing purposes, it became desirable to obtain usage data beyond the basic kilowatt-hour consumption readings available with many electricity meters. For example, additional desired data included rate of electricity consumption, or date and time of consumption (so-called "time of use" data). Solid state devices provided on printed circuit boards, for example, utilizing programmable integrated circuit components, have provided effective tools for implementing many of such higher level monitoring functions desired in the electricity meter context.

In addition to the beneficial introduction of electronic forms of metrology, a variety of electronic registers have been introduced with certain advantages. Still further, other forms of data output have been introduced and are beneficial for certain applications, including wired transmissions, data output via radio frequency transmission, pulse output of data, and telephone line connection via such as modems or cellular linkups.

The advent of such variety and alternatives has often required utility companies to make choices about which technologies to utilize. Such choices have from time to time been made based on philosophical points and preferences and/or based on practical points such as, training and familiarity of field personnel with specific designs.

Another aspect of the progression of technology in such area of metrology is that various retrofit arrangements have been instituted. For example, some attempts have been made to provide basic metering devices with selected more advanced features without having to completely change or replace the basic meter in the field. For example, attempts have been made to outfit a basically mechanical metering device with electronic output of data, such as for facilitating radio telemetry linkages.

Another aspect of the electricity meter industry is that utility companies have large-scale requirements, sometimes involving literally hundreds of thousands of individual meter installations, or as may be thought of as being data points. Implementing incremental changes in technology, such as retrofitting new features into existing equipment, or attempting to implement changes to basic components which make various components not interchangeable with other configurations already in the field, can generate considerable industry problems.

Electricity meters typically include input circuitry for receiving voltage and current signals at the electrical service. Input circuitry of whatever type or specific design for receiving the electrical service current signals is referred to herein generally as current acquisition circuitry, while input circuitry of whatever type or design for receiving the electrical service voltage signals is referred to herein generally as voltage acquisition circuitry.

Electricity meter input circuitry may be provided with capabilities of monitoring one or more phases, depending on whether monitoring is to be provided in a single or multiphase environment. Moreover, it is desirable that selectively configurable circuitry may be provided so as to enable the provision of new, alternative or upgraded services or processing capabilities within an existing metering device. Such variations in desired monitoring environments or capabilities, however, lead to the requirement that a number of different metrology configurations be devised to accommodate the number of phases required or desired to be monitored or to provide alternative, additional or upgraded processing capability within a utility meter.

More recently a new ANSI protocol, ANSI C12.22, is being developed that may be used to permit open protocol communications among metrology devices from various manufacturers. C12.22 is the designation of the latest subclass of the ANSI C12.xx family of Meter Communication and Data standards presently under development. Presently defined standards include ANSI C12.18 relating to protocol specifications for Type 2 optical ports; ANSI C12.19 relating to Utility industry Meter Data Table definitions; and ANSI C12.21 relating to Plain Old Telephone Service (POTS) transport of C12.19 Data Tables definition. It should be appreciated that while the remainder of the present discussion may describe C12.22 as a standard protocol, that, at least at the time of filing the present application, such protocol is still being developed so that the present disclosure is actually intended to describe an open protocol that may be used as a communications protocol for networked metrology and is referred to for discussion purposes as the C12.22 standard or C12.22 protocol.

C12.22 is an application layer protocol which provides for the transport of C12.19 data tables over any network medium. Current standards for the C12.22 protocol include: authentication and encryption features; addressing methodology providing unique identifiers for corporate, communication, and end device entities; self describing data models; and message routing over heterogeneous networks.

Much as HTTP protocol provides for a common application layer for web browsers, C12.22 can provide for a common application layer for metering devices. Benefits of using such a standard include the provision of: a methodology for both session and session-less communications; common data encryption and security; a common addressing mechanism for use over both proprietary and non-proprietary network mediums; interoperability among metering devices within a common communication environment; system integration with third-party devices through common interfaces and gateway abstraction; both 2-way and 1-way communications with end devices; and enhanced security, reliability and speed for transferring meter data over heterogeneous networks.

To understand why utilities are keenly interested in open protocol communications; consider the process and ease of sending e-mails from a laptop computer or a smart phone. Internet providers depend on the use of open protocols to provide e-mail service. E-mails are sent and received as long as e-mail addresses are valid, mail boxes are not full, and communication paths are functional. Most e-mail users have the option of choosing among several internet providers and several technologies, from dial-up to cellular to broadband, depending mostly on the cost, speed, and mobility. The e-mail addresses are in a common format, and the protocols call for the e-mail to be carried by communication carriers without changing the e-mail. The open protocol laid out in the ANSI C.12.22 standard provides a similar opportunity for meter-related communications over networks.

In addition, the desire for increased processing capabilities as well as other considerations including, but not limited to, a desire to provide firmware that may be placed into existing metering devices, leads to requirements for uploading such significant numbers of meters that may be installed over a significant area often encompassing many square miles.

As such, it is desired to provide a universal metrology technology and associated methodology that permits remote installation of firmware to provide firmware upgrade of all or selected meters within a service area without having to dispatch service personnel to manually upgrade each individual meter.

While various aspects and alternative embodiments may be known in the field of utility metering, no one design has emerged that generally encompasses the above-referenced characteristics and other desirable features associated with utility metering technology as herein presented.

SUMMARY OF THE INVENTION

In view of the recognized features encountered in the prior art and addressed by the present subject matter, improved apparatus and corresponding methodology allowing reprogramming of all or portions of firmware associated with an installed metrology device (or pluralities thereof) has been provided.

In an exemplary arrangement, a methodology has been provided to permit transmission through a network of a firmware image file to various end devices including meters and relays.

In one of its simpler forms, the present technology provides for the broadcast transmission of a firmware image file to all or selected end devices from a central facility.

One positive aspect of such firmware image file transmission methodology is that a general broadcast does not require immediate acknowledgement of the receipt of transmissions.

Another positive aspect of such type of broadcast transmission is that a complete transmission of a firmware image file may for some embodiments be accomplished by subdividing the firmware image file into smaller segments for broadcast.

Yet another positive aspect of the methodology of the present subject matter is that the order of transmission of the smaller segments is immaterial.

In further present exemplary arrangements, various present features may involve the use of non-volatile memory (such as flash) and a two-way communications network to upgrade remotely the firmware in an electricity meter. To minimize bandwidth usage on such network, firmware updates may be sent in smaller discrete portions and combined at the endpoint devices.

In still further present exemplary arrangements, various such present features may involve apparatus and methodology for downloading firmware in an RF mesh network that is arranged in hierarchical layers, or a "tree"-configured arrangement. Firmware code updates may, for example, be downloaded to a first layer of devices in the network. Upon successful download to devices on a so-called first level, such new code updates may then be downloaded to the next level of devices, and so on until all updates are complete.

In additional present exemplary arrangements, present features may involve apparatus and methodology for downloading (that is, updating) firmware in a utility meter with use of a system and method of relaying updates via a two-way communications network. It is understood that different meters may require different types of firmware updates. Also, a given meter may require different firmware images depending on which of a plurality of processors (e.g., register board, RF LAN microprocessor, Zigbee processor, or the like) are to be updated. As such, firmware downloads are preferably configured for distribution among all endpoints in a network (or as many as possible) to help communicate the updates to the desired meters. Meter endpoints are also operative per present methodology so as to be able to determine from the communicated messages whether or not the update is applicable to its actual hardware. If so, the meter can be configured to install the update. If not, the meter simply acts as a host or repeater for relaying the updates to other meters for which the updates are targeted.

In yet additional present exemplary aspects, there is provision of apparatus and methodology for upgrading firmware in previously installed revenue meters. Such exemplary upgrade process preferably comprises three stages. In the first stage, the device to be updated is put in a mode that enables the device to be updated in subsequent stages. During such first stage, information is transmitted to the device telling it the amount of data to be transmitted, the checksums for that data and other relevant information. In the second stage, upgrade data is transmitted as small fragments to one or more devices to be upgraded. Such fragments may be transmitted in any order and their receipt is intentionally not acknowledged by the receiving devices. In the third stage, the upgrade server attempts point-to-point communications with individual devices to determine whether all of the fragments have been accurately received. If not, individual segments (fragments) are retransmitted until the device has accurately received all transmitted segments. After all segments (fragments) have been accurately received, the update server can activate the firmware within the device.

One exemplary present embodiment relates to an advanced metering system including apparatus for upgrading firmware of one or more metrology devices and adjunct devices configured in common association. Such advanced metering system may preferably comprise a plurality of end devices, at least some of which end devices comprise metrology devices, and may preferably comprise a network including a central facility comprising an update server and a collection engine. Such collection engine preferably may include an orchestration manager for distributing metrology device data communications functionality. Further, such network is preferably configured for bi-directional communications between the central facility and each of the plurality of end devices, and configured so as to notify selected of the plurality of such end devices of a pending firmware image download, broadcast such firmware image download as a series of individual fragments, establish communications between the central facility and such selected plurality of such end devices, and determine whether all of such individual fragments of such firmware image download have been accurately received.

In various alternatives of such advanced metering systems, such network may be configured for establishing point-to-point communications from such central facility to each of such selected plurality of such end devices.

In various other alternatives of such advanced metering systems, such a system may further comprise at least one cell relay configured to transmit previously received individual fragments of such firmware image download to the selected of such plurality of such end devices. In such fashion, individual fragments of such firmware image download may be transmitted virally among portions of such network independently of any other network communications.

In still further other various alternatives of such advanced metering systems, selected of the plurality of such end devices may be configured to transmit previously received individual fragments of such firmware image download to others of such plurality of such end devices. In such fashion, individual fragments of such firmware image download may be transmitted virally among portions of such network independently of other network communications.

Other present exemplary embodiments equally relate to various methodologies, one example of which relates to a method for downloading a firmware image through a network to a plurality of network devices. More particularly, such exemplary present method relates to establishing a network including a central facility and a plurality of end devices; configuring the network for bi-directional communications between the central facility and each of the plurality of end devices; notifying selected of the plurality of end device of a pending firmware image download; broadcasting the firmware image download as a series of individual fragments; establishing communications between the central facility and the selected plurality of end devices; and determining whether all of the fragments of the firmware image download have been accurately received.

In present variations of such exemplary methodology, such establishing of communications step may preferably include establishing point-to-point communications from the central facility to each of the selected plurality of end devices; and such notifying step may preferably include transmitting information from the central facility to selected of the plurality of end devices regarding the amount of data to be transmitted and the checksum for the data.

In other present variations of exemplary methodology, individual fragments of the firmware image may be transmitted virally among portions of the network independently of other network communications.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents including combinations of features, parts, or steps or configurations thereof not expressly shown in the figures or stated in the detailed description of such figures. Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
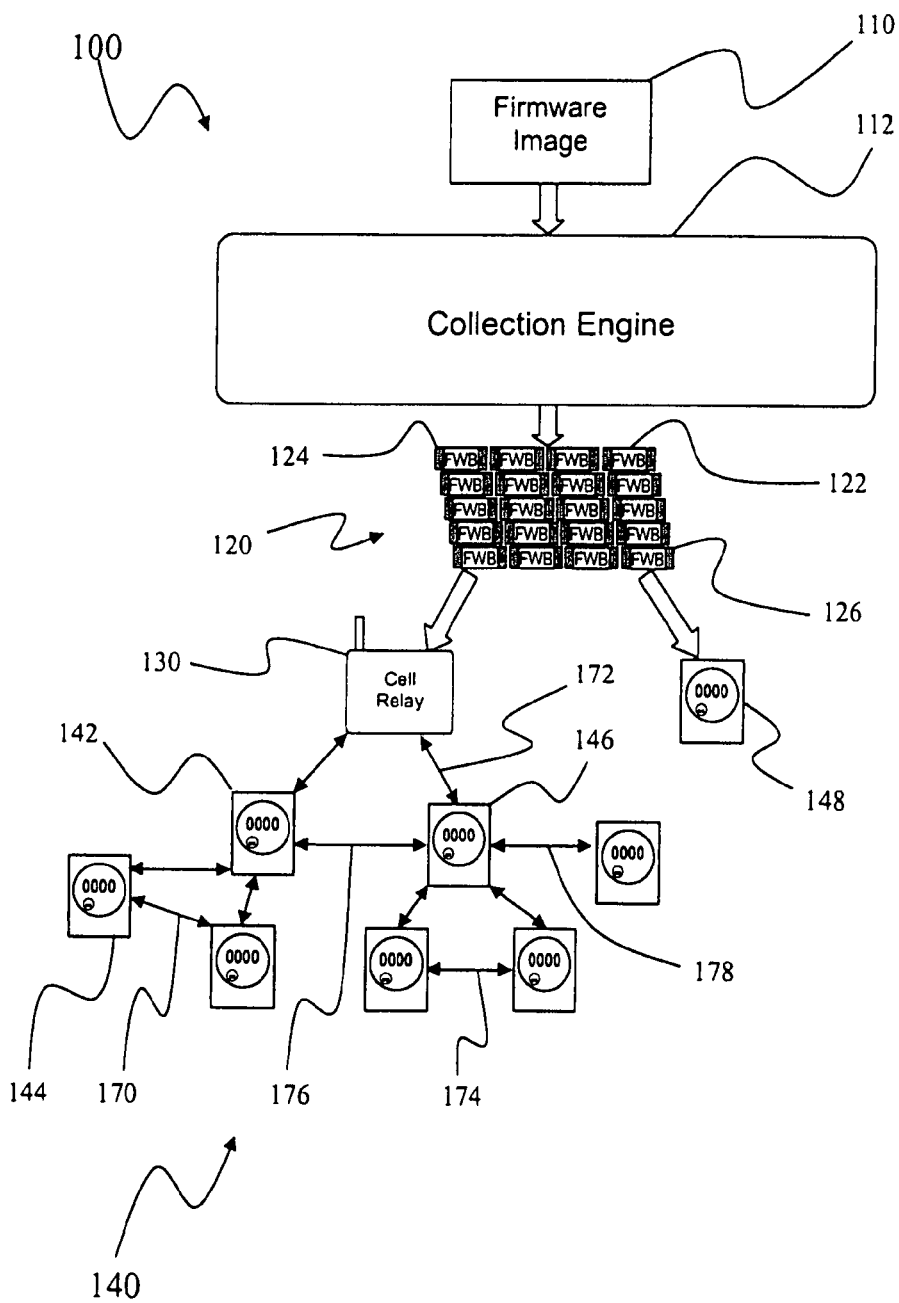
FIG. 1 schematically illustrates an exemplary methodology and corresponding apparatus for transmitting firmware to end devices in accordance with the present subject matter.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with improved corresponding apparatus and methodology allowing reprogramming of all or portions of firmware associated with one or a plurality of installed metrology devices.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject firmware download methodology and apparatus. Referring now to the drawings, FIG. 1 schematically illustrates an exemplary configuration (representing both methodology and apparatus) for implementing one or more firmware downloads in accordance with the present technology. While for exemplary purposes, most of the discussion herewith refers to such firmware downloads as new or upgraded firmware, it is to be understood that the present subject matter is equally applicable to, and fully encompasses, any firmware downloads, regardless of their characterization. For example, it might be due to particular circumstances and/or needs that the firmware to be downloaded for or to a particular device is a return to a previous version of firmware for such device. As another example, it might be that the firmware download for a particular device is regarded as being the same version of firmware, or a corrected version thereof, presently resident and operating with such device, as a technique for in effect rebooting the device, or otherwise correcting some corrupted subject matter. All of such variations in the actual constitution and characterization of the nature and/or reasons for the subject downloads, are intended to come within in the spirit and scope of the present subject matter.

When new or upgraded firmware is to be installed within a system 100, an image 110 of the firmware to be downloaded will be provided to an Advanced Metering System (AMS) Collection Engine 112 as a binary image file. Further discussion of Collection Engine 112 is included herewith but for the present it is noted that Collection Engine 112 is responsible for breaking up the single binary image into a series 120 of discrete blocks 122 that can be distributed across a communications arrangement such as an RF LAN, or other media. In an exemplary embodiment, an ANSI C12.22 compliant media may be used. Such blocks 122 will contain a hash or checksum for the block itself to verify the block's integrity, as well as a block identifier, which is represented in FIG. 1 by the leading and trailing spaces 124 and 126, respectively.

In general, when transferring blocks, each broken down, discrete block 122 is in its entirety preferably written into a record in a manufacturer's table for firmware images. End devices 140 are configured to evaluate such blocks 122 to determine their discrete integrity by using their block level hashes. The end devices can also validate that such blocks 122 are assembled (that is, reassembled) into the correct order. Finally, each end device is able to evaluate the integrity of the overall image by evaluating the CRC (Cyclic Redundancy Check) or hash for the entire image.

The basic present process for transferring firmware image blocks 122 involves in part functionality that is similar to that used for reading data from meters. A broadcast containing the image blocks 122 is sent to meters 140. Meters 140 indicate, in a manner described further herein, that they have successfully received the image blocks 122. Meters that don't respond are retried in a recovery process to make up for any failures. Because of the critical nature of firmware images, and the large number of blocks involved, some additional control and feedback mechanisms may be desired in some instances, to logistically handle the volume of traffic.

Managing the transport of firmware blocks 122 in an environment which encounters or involves unreliable media becomes critical when transferring firmware images. In an exemplary configuration, a 384k byte firmware image broken into 64 byte blocks will require 6,144 blocks to be transferred completely successfully before it can be loaded. When transferring blocks across an RF LAN, for example, it is relatively likely that at least one node within a given cell will fail to successfully receive a block. Such circumstances are presently addressed in two key manners. First, it is important that blocks be able to be transmitted and received in any order. Second, depending on the practical reliability of the underlying network, in accordance with present subject matter, it may in some instances be practiced to broadcast a given block several times before resorting to point-to-point transfers of image blocks. In an exemplary configuration, it has been found that upper level systems, that is the Collection Engine 112 and/or a cell relay 130, should preferably transmit the firmware image at least twice, and in some instances three or four times, before resorting to point-to-point transfer of image blocks.

With further reference to FIG. 1, a firmware download process begins with the Collection Engine 112 sending out a broadcast message to all target nodes, calling a manufacturer's stored procedure or writing to a manufacturer's table in the device. In such context, a target node may correspond to an end device such as meter 148, cell relay 130, or meters 140 including representative meters 142, 144, and 146. Such command indicates to the device the number of firmware blocks it should expect to receive, and that it should now be in firmware download mode.

When in such firmware download mode, the device will report the number of blocks it has successfully received as part of any daily read requests. Additionally, being placed in firmware download mode resets to zero a block counter of such device. Moreover, the command includes instructions to the end devices indicating that no direct acknowledgements on the part of the meters should be made. Rather, devices acknowledge such command by reporting their success count as part of the next interrogation cycle.

Collection Engine 112 is responsible for evaluating, based on the presence of the firmware block success count, whether all of the targeted nodes have successfully entered firmware download mode. Nodes that have not switched to firmware download mode eventually are then individually contacted by the Collection Engine 112.

Once the target nodes are in firmware download mode, Collection Engine 112 will begin broadcasting firmware blocks 122 to the target nodes 140. As an alternative to transmission of the firmware blocks 122 exclusively by Collection Engine 112, it may be desirable to transfer the firmware image 110 to the cell relays 130 and then send a command to instruct them to broadcast the firmware image 110 within their respective cell. Such alternative method would be one approach to reducing public carrier back-haul costs and to allowing cell relays to better manage bandwidth within their cells.

Completion of the broadcast transfers is a process that may take several days, or even weeks, depending on whether it is being done in conjunction with other operations. In any event, after such completion, Collection Engine 112 begins evaluating the block success count of each of the target nodes. When a node has a complete set of blocks, it will record a special event in the meter history log indicating such successful completion. Most nodes should have a complete set of blocks once the broadcast transfers are complete. Nodes that are still missing blocks will need to have them transferred point-to-point. Nodes that have excessive missing blocks after the broadcast process is complete may be flagged for possible maintenance or replacement as being potentially defective.

To facilitate point-to-point transfers, Collection Engine 112 will call a second stored procedure in the device. Such second procedure, a manufacturer's stored procedure, will provide a list of missing blocks, by block number. In an exemplary embodiment, the block list will include a predetermined maximum number of blocks, and a status byte indicating whether there is more than the predetermined number of blocks missing. For example, the predetermined maximum number of blocks may be set to twenty blocks. In using such method, most meters will receive all blocks and will not need to report on individual blocks; however, those meters that are missing blocks can be interrogated for a manifest of what they still require.

Collection Engine 112 will use such missing block data provided by the respective meter 140 to perform point-to-point block transfers. Meter nodes that cannot be contacted will be reported to the system operator. Once the point-to-point retries have been completed, the devices can be instructed to enable the new firmware. The command to activate the firmware may correspond to a C12.22 manufacturer's stored procedure. If a date and time is specified, the device will activate the firmware at the specified date and time. If no date and time is provided, the device normally will be set to activate the firmware download on an immediate basis.

Successful firmware activation can involve two additional aspects. First, selected metrology devices, i.e., meters, may employ not just one, but a plurality of images related to different aspects of the device's operation. In an exemplary configuration, at least three separate firmware images may be employed: one for the meter register board, another for a neighborhood local area network (LAN) microprocessor, and a third for a home area network (HAN) processor. In a more specific exemplary configuration, the neighborhood local area network microprocessor may correspond to an RF LAN microprocessor while the home area network processor may correspond to a Zigbee processor. Each of such components will have its own firmware image that may need to be updated. Additionally, over the course of time, new metrology device versions which require different firmware may be incorporated into existing systems. In such case, a given cell may have a mixture of devices with different firmware needs. For example, the Zigbee protocol may be used for communicating with gas meters, in-home displays, load-control relays, and home thermostats.

Figure 2:
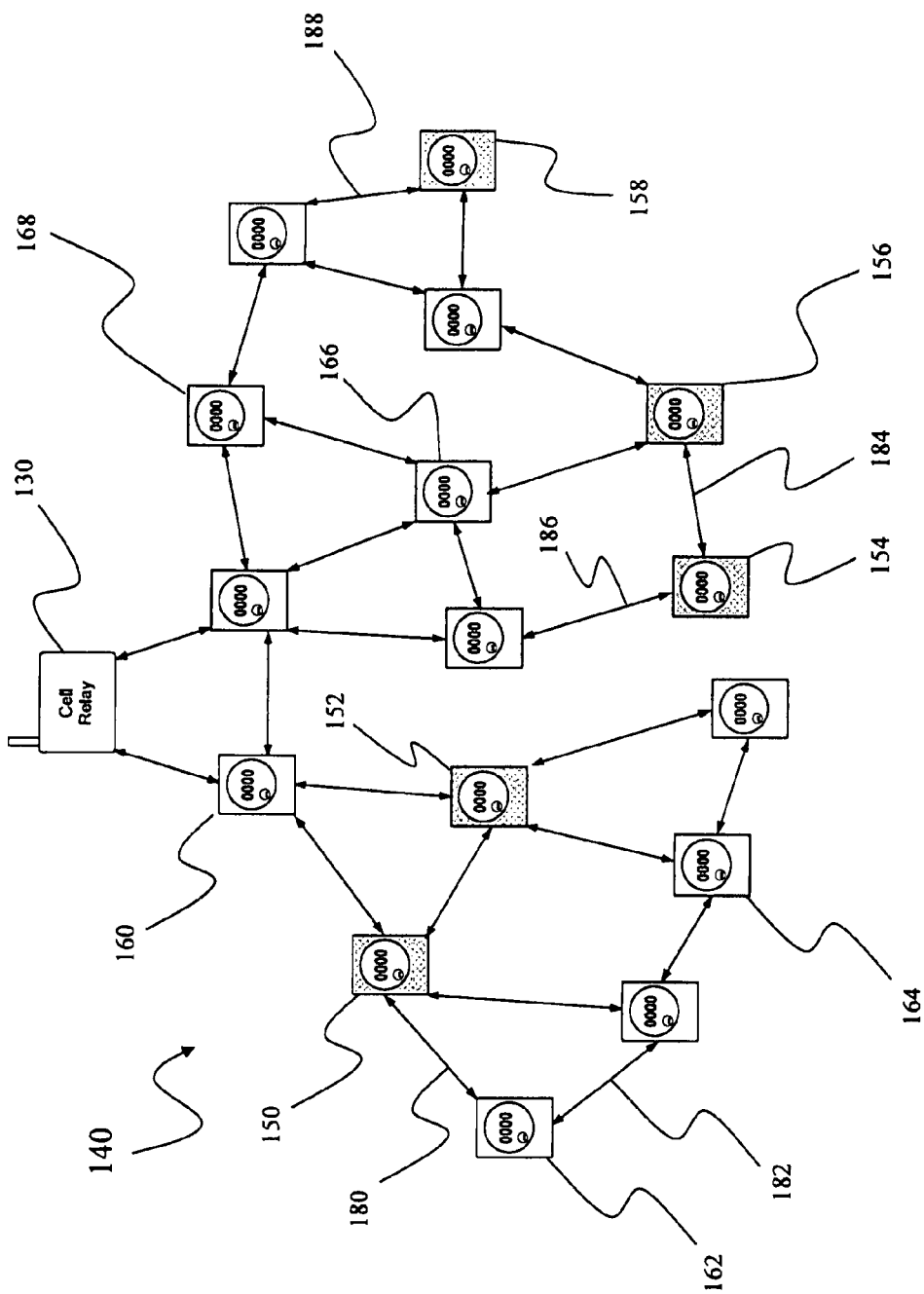
FIG. 2 schematically illustrates an exemplary methodology and corresponding apparatus for transmitting differing firmware images to selected end devices.

With reference presently to FIG. 2, there is illustrated and represented an exemplary methodology (and corresponding apparatus) for transmitting differing firmware images to selected end devices. As illustrated in FIG. 2, for the general group of meters 140 illustrated, a first subset of such meters illustrated with a white background (and generally represented by meters 160, 162, 164, 166, and 168) support one firmware image, while a second subset of generally illustrated meters 140 illustrated with a grey background (and generally represented by meters 150, 152, 154, 156, and 158) support another firmware image. As a result, while meters 162, 164 are under meters 150, 152 in the cell network hierarchy (or tree) and may be able to exchange firmware images with each other, the only way meters 162, 164 can receive their firmware is through meters 150, 152, which in the present example are of another device type.

In order to handle such exemplary circumstances as represented in present FIG. 2, the firmware image distribution system is independent of the actual device for which the firmware is intended. Put another way, when an image is delivered to cell relay 130 and distributed over the RF LAN, it is distributed to all of the members of the cell that match the broadcast or multicast address used, regardless of whether the image is compatible with their particular hardware. This means that in accordance with the present technology, cell members act as hosts for the firmware. In order to update both types of meters (per the present representative example), two firmware updates will need to be distributed. Firmware will be transferred first to meters of the first subset (generally represented by meters 160, 162, 164, 166, and 168), and then activated. Secondly, firmware will be transferred to meters of the second subset (generally represented by meters 150, 152, 154, 156, and 158), and then activated. Such same mechanism can be used to download separate firmware images for individual microprocessors within the end node, as needed on a case-by-case basis per a specific implementation of the present subject matter.

Advantageously, in accordance with the present subject matter, the firmware activation code not only evaluates the integrity of the individual blocks and the overall firmware image, but it also checks whether the image is applicable to its actual hardware and for which hardware it is targeted. In general, the activation command will be sent only to the appropriate devices by using a multicast group associated with the device class. Nevertheless, checking that the image is compatible with the end device is an appropriate safeguard practiced in some embodiments in accordance with present subject matter.

With reference again to both FIGS. 1 and 2, it will be observed that the various meters or nodes 140 are illustrated as being connected to one another by double-headed arrow lines (representatively illustrated at 170, 172, 174, 176, and 178 in FIG. 1, and at 180, 182, 184, 186, and 188 in FIG. 2). Such interconnections schematically illustrate a self generated network formed by the meters 140 themselves per the present subject matter, in concert with each other and cell relay 130 as the individual meters 140 are activated. Because each of the respective meters 140 is self contained with respect to the RF LAN formed, an opportunity exists to distribute upgrade software (firmware) among the various meters on a viral peer-to-peer basis.

In such foregoing viral peer-to-peer model, a firmware image may be delivered to exemplary cell relay 130. From there, Collection Engine 112 preferably may send a stored procedure command to cell relay 130, indicating that it should distribute such firmware image to the RF LAN. Collection Engine 112 also sends a command to the meter nodes within the cell using a broadcast or multicast message, instructing them that a new firmware image is available. Once such command is received, cell relay 130 makes the firmware available to its local RF LAN processor. Per the present subject matter, meter nodes 140 within such cell instruct their RF LAN processors to begin looking for blocks. At such point, the RF LAN processors take over the block transfer process. Again, per previously discussed present methodology, such blocks 122 may be sent in any order.

Such presently disclosed viral-type distribution mechanism may be very powerful and very efficient in that it may be able to make better use of the available physical bandwidth. Under such present viral peer-to-peer arrangement, individual meter nodes 140 can grab firmware images or portions of firmware images, from their immediate neighbors or parents, rather than needing to get the data directly from cell relay 130 or Collection Engine 112. As a result, one portion of the cell could be exchanging firmware blocks while another portion of the cell could be passing various messages between meter nodes 140 and cell relay 130, all without impacting each other.

Figure 3:
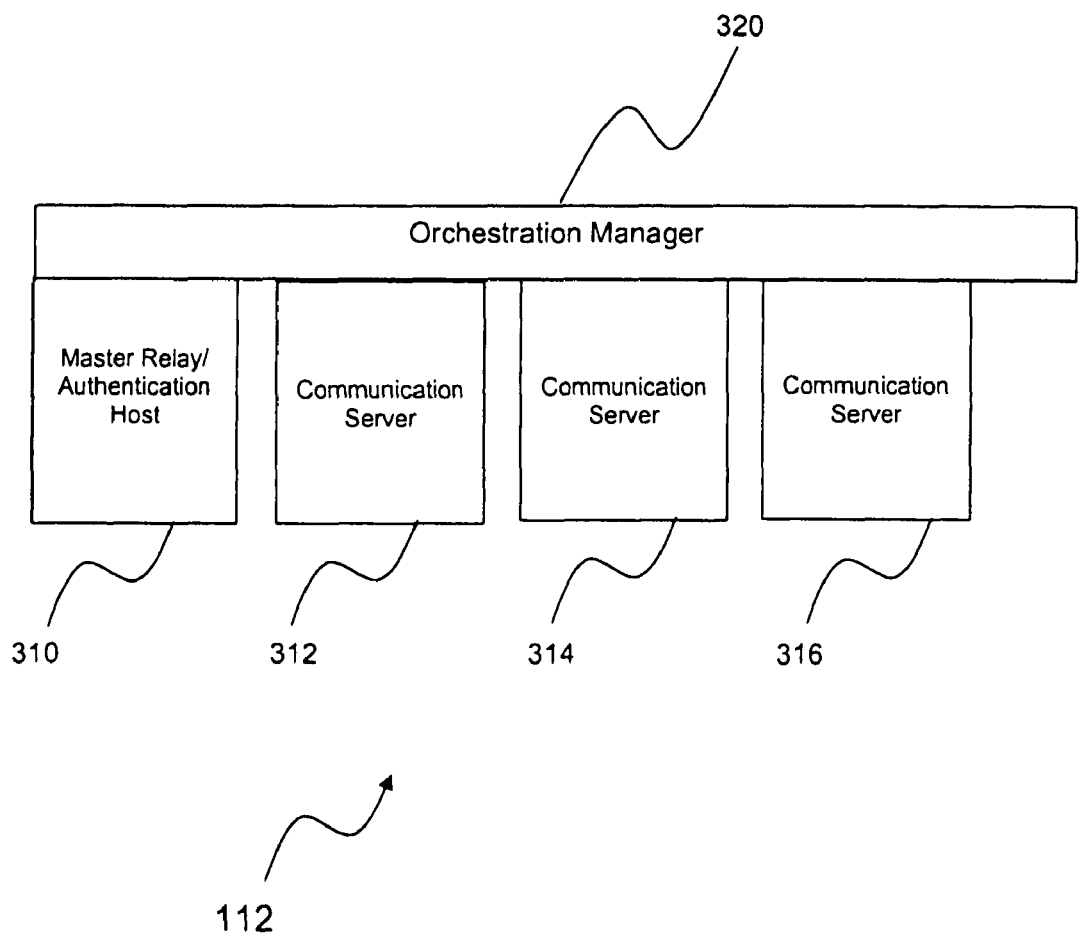
FIG. 3 illustrates a block diagram of the components of a Collection Engine in accordance with an exemplary embodiment of the present subject matter.

With reference to FIG. 3, there is illustrated a block diagram representation of exemplary components of Collection Engine 112 in accordance with an exemplary embodiment of the present subject matter. Collection Engine 112 is a collection of software-based functionality which provides ANSI C12.22 services to the devices that comprise the C12.22 network, including one or more cell relays 130 as well as the metrology and end devices 140. Though such components are preferably software-based, those of ordinary skill in the art will appreciate various equivalent forms of implementation, providing the same functionality. Conceptually, Collection Engine 112 is comprised of three major components, the Orchestration System or Manager generally 320, the Master Relay/Authentication Host 310, and the communications server or servers (represented by illustrated components 312, 314, and 316). Collection Engine 112 is implemented preferably so as to be able to distribute work across multiple servers 312, 314, and 316 in order to facilitate scaling.

Within a C12.22 system, the Master Relay 310 is the coordinating process for the overall system. In order to send or receive C12.22 messages, respective nodes 140 must be registered with the Master Relay. However, before a respective node is allowed to register, it must be authenticated. The Authentication Host provides such functionality in the present exemplary embodiment. The Master Relay or station is responsible for the actual meter data acquisition process, communicating with the meter via C12.22 messages.

As will be understood by those of ordinary skill in the art, each of the respective major components of Collection Engine 112 is in turn made up of a series of smaller components and functionality feature sets. The Orchestration Manager or layer 320 provides coordination between such components, and presents a unified, single API (Application Layer Interface) to upstream systems. The Orchestration Manager or system 320 runs as a single master orchestration service (or functionality) and as a series of agents. Each separate physical server will have an orchestration agent to tie it into the larger system. API requests are directed to a master orchestration service (or functionality) which in turn works with the orchestration agents to ensure that requested work or methodology is performed or executed.

The Master Relay/Authentication Host 310 will provide standard C12.22 registration services/functionality as well as integrated C12.22 network authentication functionality/services. One vision for the C12.22 protocol is that, similar to DNS (Domain Name Servers), a C12.22 master relay may be created which would be shared between multiple utilities, perhaps providing services to an entire region or country. With such approach in mind, implementation of a master relay in accordance with present technology should provide full support for the use of other authentication hosts, and for sending notification messages to registered hosts. Additionally, the Orchestration Manager or layer 320 is preferably implemented so as to be able to receive notifications from master relays from other manufacturers, meaning that an implementation of the present subject matter could be realized employing a master relay from an outside source.

The representative Communications Servers 312, 314, and 316 provide communication functionality with devices, such as to parse and translate such communications, and post or return data as necessary. Communication Servers 312, 314, and 316 thus preferably may comprise a series of services/functionality to accomplish such overall functionality per the present subject matter. Within Communications Servers 312, 314, and 316 are a series of major components: a meter communications host, a data spooler, and an exception event manager. The meter communications host is responsible for listening for network communications and sending network communications. It is the component that both "speaks" C12.22 and "interprets" C12.19 table data. The data spooler and the exception event manager provide mechanisms for streaming meter data and exception events, respectively, to upstream systems.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for downloading a firmware image through a network to a plurality of network devices, comprising:
   establishing a network including a central facility and a plurality of end devices, wherein said plurality of end devices comprises metrology devices;
   configuring the network for bi-directional communications between the central facility and each of the plurality of end devices in accordance with an open standard meter communication protocol;
   notifying selected of the plurality of end device of a pending firmware image download;
   broadcasting the firmware image download as a series of individual fragments;
   configuring selected of the plurality of end devices to transmit previously received individual fragments of the firmware image to others of the plurality of end devices such that individual fragments of the firmware image are transmitted virally among portions of the network independently of any other network communication;
   establishing point-to-point communications between the central facility and the selected plurality of end devices, wherein said establishing point-to-point communications occurs only after broadcasting the firmware image a predetermined number of times; and
   determining whether all of the fragments of the firmware image download have been accurately received at each end device in the selected plurality of end devices, wherein if it is determined that at least one fragment was not accurately received by at least one of the selected plurality of end devices, retransmitting the firmware image to each end device that did not accurately receive the entire firmware image via the point-to-point communications established between the central facility and the selected plurality of end devices.

2. A method as in claim 1, wherein:
   notifying comprises transmitting information from the central facility to selected of the plurality of end devices regarding an amount of data to be transmitted and a checksum for the data.

3. A method as in claim 1, wherein:
   broadcasting comprises broadcasting the series of individual fragments independently of fragment sequence.

4. A method as in claim 1, further comprising configuring the network end devices to assemble the individual fragments in accordance with the original firmware image.

5. A method as in claim 1, wherein:
   establishing a network further includes:
      providing at least one cell relay; and
      configuring the network such that bi-directional communication between the central facility and selected of the plurality of end devices passes through the at least one cell relay; whereby bi-directional communication between the central facility and selected of the plurality of end devices is conducted by way of the cell relay while bi-directional communication between the central facility and others of the plurality of end devices is conducted directly.

6. A method as in claim 1, wherein:
   said method further comprises configuring selected of the plurality of network end devices to relay bi-directional communications between the central facility and others of the plurality of network end devices.

7. A method as in claim 1, wherein:
notifying comprises notifying selected of the plurality of end devices of a pending firmware image download of a first type.

8. A method as in claim 7, wherein notifying further comprises:
notifying selected others of the plurality of end device of a pending firmware image download of a second type;
whereby different end devices requiring different firmware image types may receive appropriate firmware images by way of the same network.

9. A method as in claim 8, further comprising configuring selected of the plurality of network end devices to relay bi-directional communications between the central facility and others of the plurality of network end devices.

10. A method as in claim 9,
wherein individual fragments of a firmware image may be transmitted virally among portions of the network independently of the image type.

11. A method as in claim 9, further comprising:
providing at least one cell relay;
configuring the at least one cell relay to transmit previously received individual fragments of a firmware image to selected of the plurality of end devices;
whereby individual fragments of a firmware image may be transmitted virally among portions of the network independently of the image type.

12. A method as in claim 1, wherein establishing a network comprises:
establishing a network including a central facility comprising an update server and a collection engine;
wherein the plurality of end devices are configured to transmit acknowledgement of receipt of individual fragments as a portion of a response to an interrogation cycle from the collection engine.

13. An advanced metering system including an apparatus for upgrading firmware of one or more metrology devices and adjunct devices configured in common association, said system comprising:
a plurality of end devices, at least some of which end devices comprise metrology devices; and
a network including a central facility comprising an update server and a collection engine, said collection engine including an orchestration manager for distributing metrology device data communications functionality, and said network being configured for bi-directional communications between said central facility and each of said plurality of end devices in accordance with an open standard meter communication protocol, and configured so as to (A) notify selected of said plurality of said end devices of a pending firmware image download, (B) broadcast said firmware image download as a series of individual fragments, (C) configure selected of the plurality of end devices to transmit previously received individual fragments of the firmware image to others of the plurality of end devices such that individual fragments of the firmware image are transmitted virally among portions of the network independently of any other network communication, (D) establish point-to-point communications between said central facility and said selected plurality of said end devices, wherein said establishing point-to-point communications occurs only after broadcasting the firmware image a predetermined number of times, and (E) determine whether all of said individual fragments of said firmware image download have been accurately received at each end device in the selected plurality of end devices, wherein if it is determined that at least one fragment was not accurately received by at least one of the selected plurality of end devices, retransmitting the firmware image to each end device that did not accurately receive the entire firmware image via the point-to-point communications established between the central facility and the selected plurality of end devices.

14. An advanced metering system as in claim 13, wherein:
said collection engine is configured for conducting an interrogation cycle with said metrology devices; and
said metrology devices respectively comprise a plurality of utility meters configured to transmit acknowledgement of receipt of said individual fragments as a portion of a response to said interrogation cycle from said collection engine, and configured to assemble said individual fragments in accordance with said firmware image download.

15. An advanced metering system as in claim 13, further comprising at least one cell relay configured to transmit previously received individual fragments of said firmware image download to said selected of said plurality of said end devices.

16. An advanced metering system as in claim 13, wherein said orchestration manager is configured for distributing metrology device data communications functionality across multiple servers, and comprises:
a master relay configured to register and authenticate multiple communication nodes associated with one or more respective metrology devices and to assign communication functionality associated with said multiple communication nodes to a plurality of communication servers, each of which includes a meter communications host configured to send and receive network communications in accordance with the open standard meter communication protocol; and
a plurality of communication servers configured to communicate with at least a selected portion of said multiple communication nodes, each communication server configured to send and receive network communications and to acquire metrology data from said multiple communications nodes; and
wherein said multiple communication nodes associated with one or more respective metrology devices comprise at least one communication node comprising at least one cell relay operating on a radio network and at least one communication node comprising a communications link directly to an end point.

17. An advanced metering system as in claim 13, further comprising at least one cell relay, with said at least one cell relay and said network configured such that bi-directional communication between said central facility and selected of said plurality of said end devices passes through said at least one cell relay, whereby bi-directional communication between said central facility and said selected of said plurality of said end devices is conducted by way of said at least one cell relay while bi-directional communication between said central facility and others of said plurality of said end devices is conducted directly.

* * * * *